United States Patent
Xu et al.

(10) Patent No.: US 9,800,925 B2
(45) Date of Patent: Oct. 24, 2017

(54) METHOD, TERMINAL, AND SYSTEM FOR COMMUNICATION PAIRING OF A DIGITAL TELEVISION TERMINAL AND A MOBILE TERMINAL

(71) Applicant: TENCENT TECHNOLOGY (SHENZHEN) COMPANY LIMITED, Shenzhen (CN)

(72) Inventors: Hao Xu, Shenzhen (CN); Xiaobing Fu, Shenzhen (CN); Gang Huang, Shenzhen (CN); Shengjie Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/749,251

(22) Filed: Jun. 24, 2015

(65) Prior Publication Data

US 2015/0296251 A1 Oct. 15, 2015

Related U.S. Application Data

(63) Continuation of application No. PCT/CN2013/087060, filed on Nov. 13, 2013.

(30) Foreign Application Priority Data

Dec. 25, 2012 (CN) .......................... 2012 1 0570746

(51) Int. Cl.
*H04N 21/4367* (2011.01)
*H04W 12/04* (2009.01)
(Continued)

(52) U.S. Cl.
CPC ......... *H04N 21/4367* (2013.01); *G06Q 30/00* (2013.01); *H04N 21/4126* (2013.01);
(Continued)

(58) Field of Classification Search
CPC ......... H04N 21/4126; H04N 21/43637; H04N 21/4223; H04N 21/4353; H04N 21/4367;
(Continued)

(56) References Cited

U.S. PATENT DOCUMENTS 5,793,028 A * 8/1998 Wagener ............... G06Q 20/04
235/375
5,848,157 A * 12/1998 Chapel ................. H04N 7/1675
348/E7.056

(Continued)

FOREIGN PATENT DOCUMENTS

CN 1867142 A 11/2006
CN 101855861 A 10/2010
(Continued)

OTHER PUBLICATIONS

The World Intellectual Property Organization (WIPO) International Search Report for PCT/US2013/087060 Feb. 20, 2014.
(Continued)

*Primary Examiner* — Nathan Flynn
*Assistant Examiner* — Cynthia Fogg
(74) *Attorney, Agent, or Firm* — Anova Law Group, PLLC (57) ABSTRACT

Embodiments of the present disclosure disclose a method, a terminal, and a system for communication pairing of a digital television terminal and a mobile terminal. The method for communication pairing with a digital television terminal includes: acquiring communication connection information of the digital television terminal, wherein the communication connection information includes communication hardware information of the digital television terminal; performing encoding according to the communication connection information to generate a two-dimensional code image; displaying the two-dimensional code image; estab-
(Continued)

lishing a link connection to a mobile terminal that acquires the two-dimensional code image by using a camera; and performing communication pairing with the mobile terminal by means of the established link connection. By using the present disclosure, communication connection and pairing between a mobile terminal and a digital television terminal can be completed easily and conveniently.

13 Claims, 2 Drawing Sheets

(51) Int. Cl.
*H04N 21/41* (2011.01)
*H04N 21/414* (2011.01)
*H04N 21/435* (2011.01)
*H04N 21/4363* (2011.01)
*G06Q 30/00* (2012.01)
*H04W 84/18* (2009.01)

(52) U.S. Cl.
CPC ... *H04N 21/41407* (2013.01); *H04N 21/4353* (2013.01); *H04N 21/43637* (2013.01); *H04W 12/04* (2013.01); *H04W 84/18* (2013.01)

(58) Field of Classification Search
CPC ........... H04N 21/4121; H04N 21/2347; H04N 2201/3281; H04N 21/41407; H04N 21/6334; H04N 21/258; H04N 5/4403; H04N 5/43637; H04L 63/0428; H04L 9/0825; H04L 2209/603; H04L 2463/101; H04L 63/0442; G06F 21/10; G06F 21/606; H04W 12/04; H04W 84/18; G06Q 30/00
See application file for complete search history.

(56) References Cited

U.S. PATENT DOCUMENTS

| | | | | |
|---|---|---|---|---|
| 8,255,680 B1* | 8/2012 | Gong | ...................... | H04L 29/06 380/37 |
| 8,856,380 B2* | 10/2014 | DelloStritto | .......... | G06F 13/387 455/557 |
| 2001/0051996 A1* | 12/2001 | Cooper | .................. | G06Q 10/10 709/217 |
| 2006/0107299 A1* | 5/2006 | Bartfeld | ............. | H04N 7/17318 725/110 |
| 2008/0092154 A1* | 4/2008 | Hogyoku | ............... | H04N 7/163 725/1 |
| 2011/0314507 A1* | 12/2011 | Keen | ........................ | H04N 7/18 725/77 |
| 2012/0162515 A1* | 6/2012 | Lee | ................... | H04N 21/25816 348/563 |
| 2012/0168510 A1* | 7/2012 | Gratton | .............. | G06Q 30/0207 235/462.1 |
| 2012/0222081 A1* | 8/2012 | Schaefer | ................ | H04N 17/04 725/132 |
| 2013/0111009 A1* | 5/2013 | Sng | ..................... | H04L 67/2809 709/224 |
| 2013/0124740 A1* | 5/2013 | Liansky | .................. | G06F 15/16 709/228 |
| 2014/0007211 A1* | 1/2014 | Yang | ....................... | H04L 63/08 726/7 |

FOREIGN PATENT DOCUMENTS

| | | |
|---|---|---|
| CN | 102289726 A | 12/2011 |
| CN | 102711057 A | 10/2012 |
| CN | 102802155 A | 11/2012 |
| CN | 102811279 A | 12/2012 |

OTHER PUBLICATIONS

The State Intellectual Property Office of the People's Republic of China (SIPO) Office Action 1 for 201210570746.7 Dec. 13, 2014 pp. 1-8.

The State Intellectual Property Office of the People's Republic of China (SIPO) Office Action 2 for 201210570746.7 Apr. 3, 2015 pp. 1-10.

The State Intellectual Property Office of the People's Republic of China (SIPO) Office Action 3 for 201210570746.7 Aug. 6, 2015 pp. 1-10.

\* cited by examiner

METHOD, TERMINAL, AND SYSTEM FOR COMMUNICATION PAIRING OF A DIGITAL TELEVISION TERMINAL AND A MOBILE TERMINAL

RELATED APPLICATION

This application is a continuation of PCT Application No. PCT/CN2013/087060, filed on Nov. 13, 2013, which claims priority to Chinese Patent Application No. 201210570746.7, entitled "METHOD, TERMINAL, AND SYSTEM FOR COMMUNICATION PAIRING WITH DIGITAL TELEVISION TERMINAL" and filed on Dec. 25, 2012, which is incorporated by reference in its entirety.

FIELD OF THE TECHNOLOGY

The present disclosure relates to the field of communications, and in particular, to a method, a terminal, and a system for communication pairing of a digital television terminal and a mobile terminal.

BACKGROUND OF THE DISCLOSURE

Communication between an existing intelligent handheld device and a television control device (such as a set-top box) generally needs pairing and connection through wireless fidelity (Wi-Fi, referring to a wireless communication technology) or Bluetooth. However, users may need to switch to Wi-Fi or Bluetooth of the intelligent handheld device to pair with the television control device. Users may also need to input a password configured by the television control device to complete a trusted connection. Therefore, the pairing and connection process may be very complex, and may require users to record and input a large amount of information.

SUMMARY

The existing processes of pairing and connection between an intelligent handheld device and a television control device by means of Wi-Fi or Bluetooth is very complex. Users often need to record and input a large amount of information.

In view of this, according to one aspect of the present disclosure, a method, a terminal, and a system for communication pairing between a mobile terminal and a digital television terminal are provided. The method can simply and conveniently complete the communication connection and pairing process between a mobile terminal and a digital television terminal.

In order to solve the foregoing technical problems, a first aspect of embodiments of the present disclosure provides a method for communication pairing of a mobile terminal with a digital television terminal. The method includes acquiring communication connection information of the digital television terminal, the communication connection information including communication hardware information of the digital television terminal; performing encoding according to the communication connection information to generate a two-dimensional code image; displaying the two-dimensional code image; establishing a link connection to a mobile terminal that acquires the two-dimensional code image by using a camera; and performing communication pairing with the mobile terminal by means of the established link connection.

Another aspect of the embodiments of the present disclosure further provides a method for communication pairing a mobile terminal with a digital television terminal. The method includes acquiring, by using a camera, a two-dimensional code image displayed by the digital television terminal; decoding the two-dimensional code image to obtain communication connection information of the digital television terminal, the communication connection information including communication hardware information of the digital television terminal; establishing a link connection to the digital television terminal according to the communication connection information of the digital television terminal; and performing communication pairing with the digital television terminal by means of the established link connection.

Another aspect of the embodiments of the present disclosure further provides a digital television terminal. The digital television terminal includes a communication information acquiring module, configured to acquire communication connection information of the digital television terminal, the communication connection information including communication hardware information of the digital television terminal; a two-dimensional code encoding module, configured to perform encoding according to the communication connection information to generate a two-dimensional code image; a display module, configured to display the two-dimensional code image; a link connection module, configured to establish a link connection to a mobile terminal that acquires the two-dimensional code image by using a camera; and a communication pairing module, configured to perform communication pairing with the mobile terminal by means of the established link connection.

Another aspect of the embodiments of the present disclosure further provides a mobile terminal. The mobile terminal includes a two-dimensional code acquiring module, configured to acquire, by using a camera, a two-dimensional code image displayed by the digital television terminal; a two-dimensional code decoding module, configured to decode the two-dimensional code image to obtain communication connection information of the digital television terminal, the communication connection information including communication hardware information of the digital television terminal; a link connection module, configured to establish a link connection to the digital television terminal according to the communication connection information of the digital television terminal; and a communication pairing module, configured to perform communication pairing with the digital television terminal by means of the established link connection.

Another aspect of the embodiments of the present disclosure further provides a system for communication pairing with a digital television terminal. The system includes the digital television terminal according to the embodiments of the present disclosure and the mobile terminal according to the fourth aspect of the embodiments of the present disclosure. The digital television terminal is configured to acquire communication connection information of the digital television terminal, the communication connection information including communication hardware information of the digital television terminal, perform encoding according to the communication connection information to generate a two-dimensional code image, and display the two-dimensional code image; and the mobile terminal being configured to acquire, by using a camera, the two-dimensional code image displayed by the digital television terminal, decode the two-dimensional code image to obtain the communication connection information of the digital television terminal, establish a link connection to the digital television terminal according to the communication connection information of the digital television terminal, and perform communication pairing with the digital television terminal by means of the established link connection.

It can be known from the foregoing technical solutions that in the foregoing aspects of the present disclosure, communication connection information of a digital television terminal is encoded into a two-dimensional code image, and the two-dimensional code image is displayed, so that a mobile terminal can conveniently acquire the communication connection information of the digital television terminal. Further communication connection and pairing between the mobile terminal and the digital television terminal are completed simply and conveniently, which greatly simplifies a user operation process.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following describes embodiments of the present disclosure in detail with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the embodiments of the present disclosure, the digital television terminal may be, but is not limited to, a terminal that can be used to perform digital television services, such as a digital television set-top box, an intelligent television, or an integrated digital television. The mobile terminal mentioned in the embodiments of the present disclosure may include, but is not limited to, a mobile device that has a communication function and an image acquiring function, such as a tablet computer, a mobile phone, a smart phone, an e-reader, or a notebook computer.

Figure 1:
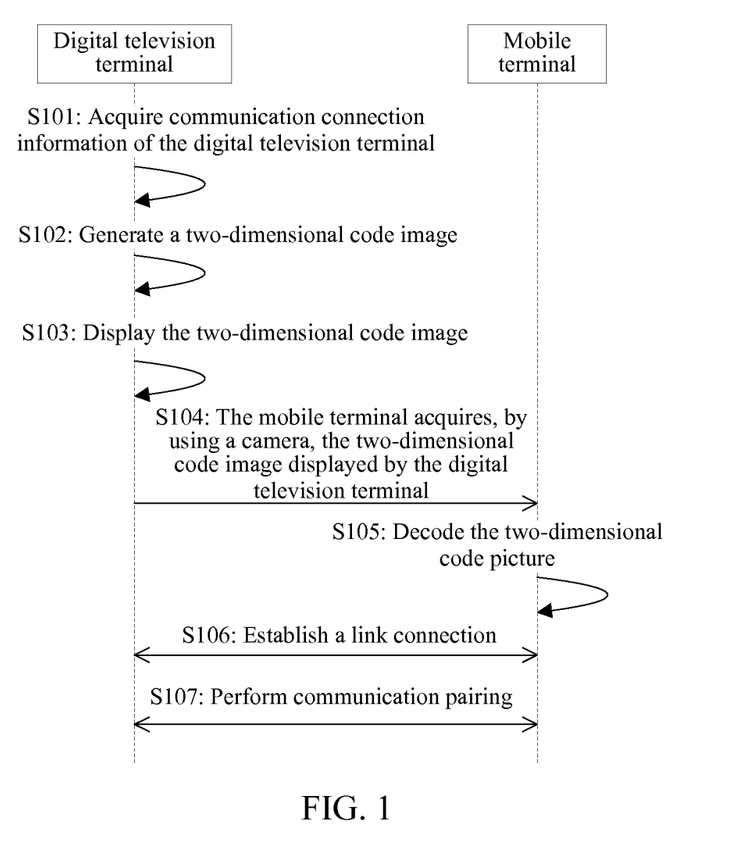
FIG. 1 is a schematic flowchart of a method for communication pairing with a digital television terminal according to an embodiment of the present disclosure.

FIG. 1 is a schematic flowchart of a method for communication pairing with a digital television terminal according to an embodiment of the present disclosure. As shown in the figure, the method for communication pairing with a digital television terminal according to this embodiment of the present disclosure includes at least the following steps.

Step S101: A digital television terminal acquires communication connection information of the digital television terminal. The communication connection information includes communication hardware information of the digital television terminal.

In this embodiment of the present disclosure, the digital television terminal may read the communication hardware information of the digital television terminal, such as a media access control (MAC) address of a network, or a physical address of Bluetooth. The communication connection information may further include other required information that can be used by a mobile terminal to establish a communication link connection to the digital television terminal, such as a username or password of Wi-Fi on which the digital television terminal is located. Further, in order to ensure security of the communication connection, the digital television terminal may further randomly generate identity authentication information (for example, an identity key), and the identity authentication information may be added to the communication connection information, so as to perform identity authentication on the mobile terminal when communication pairing is performed. Only a mobile terminal that obtains the identity authentication information can complete communication pairing with the digital television terminal.

Step S102: The digital television terminal performs encoding according to the communication connection information to generate a two-dimensional code image.

In this embodiment of the present disclosure, the digital television terminal optionally first serializes the communication connection information acquired in step S101, and then the digital television terminal optionally encrypts the serialized communication connection information so as to ensure that information included in the two-dimensional code image is not embezzled by another terminal or program. For example, the digital television terminal encrypts the communication connection information by using a preset RSA (asymmetric cryptographic algorithm) private key, and encodes the serialized and encrypted communication connection information, to obtain a corresponding two-dimensional code image. A public key corresponding to the RSA private key may be pre-stored in a mobile terminal that performs communication pairing with the digital television terminal.

Step S103: The digital television terminal displays the two-dimensional code image.

In an embodiment of the present disclosure, the digital television terminal may display the two-dimensional code image obtained in step S102 on a screen.

Step S104: A mobile terminal acquires, by using a camera, the two-dimensional code image displayed by the digital television terminal.

Step S105: The mobile terminal decodes the two-dimensional code image to obtain the communication connection information of the digital television terminal.

In this embodiment of the present disclosure, as mentioned in step S101, the communication connection information of the digital television terminal included in the two-dimensional code image includes communication hardware information of the digital television terminal. The communication connection information of the digital television terminal may include other required information that can be used by the mobile terminal to establish a communication link connection to the digital television terminal, and may further include identity authentication information randomly generated by the digital television terminal. In addition, if the communication connection information of the digital television terminal is serialized and encrypted before the two-dimensional code image is generated in step S102, the mobile terminal may be required to perform corresponding decryption and corresponding deserialization on a decoding result of the two-dimensional code image, to obtain the communication connection information of the digital television terminal. For example, in the foregoing step S102, the communication connection information is encrypted by using the preset RSA private key. Then, in this step, the two-dimensional code image needs to be decoded by using an RSA public key pre-stored in the mobile terminal, and an obtained result needs to be decrypted.

Step S106: The mobile terminal establishes a link connection to the digital television terminal according to the communication connection information of the digital television terminal.

In this embodiment of the present disclosure, the mobile terminal may initiate establishment of the link connection to the digital television terminal according to the communication hardware information of the digital television terminal in the communication connection information of the digital television terminal. If communication with the digital television terminal further requires other information (such as a username or password of Wi-Fi), the required information, such as a username or password of Wi-Fi, can also be extracted from the communication connection information obtained from the two-dimensional code image.

Step S107: The mobile terminal performs communication pairing with the digital television terminal by means of the established link connection.

In this embodiment of the present disclosure, after the link connection is successfully established in step S106, the mobile terminal may perform communication pairing with the digital television terminal by means of the successfully established communication link. Optionally, the mobile terminal may send a pairing authentication request to the digital television terminal by means of the established link connection, where the pairing authentication request carries the identity authentication information obtained in step S105. The digital television terminal determines whether the identity authentication information in the pairing authentication request is the identity authentication information randomly generated by the digital television terminal in step S101. If the identity authentication information in the pairing authentication request is the identity authentication information randomly generated by the digital television terminal in step S101, the pairing authentication request is accepted, that is, communication pairing with the mobile terminal succeeds. After pairing between the two succeeds, various remote-control signals and data transmission services can be performed by means of the communication link established in step S106.

The foregoing describes in detail a method for communication pairing with a digital television terminal according to an embodiment of the present disclosure.

According to another embodiment of the present disclosure, a digital television terminal is further provided.

Figure 2:
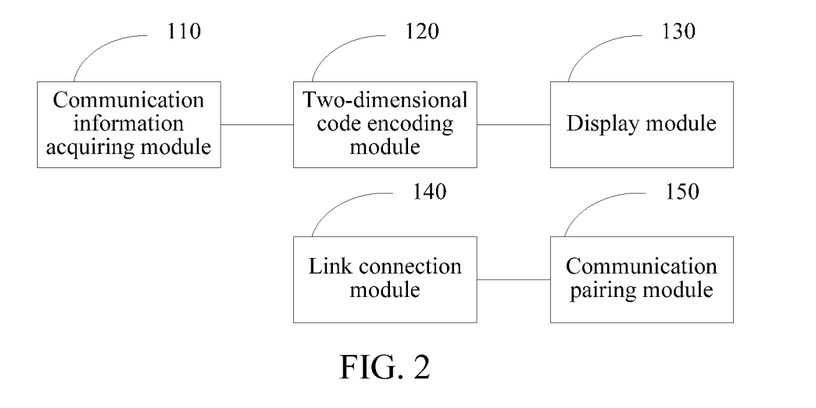
FIG. 2 is a schematic structural diagram of a digital television terminal according to an embodiment of the present disclosure.

FIG. 2 is a schematic structural diagram of a digital television terminal according to an embodiment of the present disclosure. As shown in the figure, in this embodiment of the present disclosure, the digital television terminal includes at least: a communication information acquiring module 110, a two-dimensional code encoding module 120, a display module 130, a link connection module 140, and a communication pairing module 150.

The communication information acquiring module 110 acquires communication connection information of the digital television terminal, where the communication connection information includes communication hardware information of the digital television terminal.

In this embodiment of the present disclosure, the communication information acquiring module 110 may read the communication hardware information of the digital television terminal, such as a MAC address of a network, or a physical address of Bluetooth. The communication connection information may further include other required information that can be used by a mobile terminal to establish a communication link connection to the digital television terminal, for example, may further include a username or password of Wi-Fi on which the digital television terminal is located. Further, in order to ensure security of the communication connection, the communication information acquiring module 110 may further randomly generate identity authentication information (for example, an identity key), and the identity authentication information is added to the communication connection information, so as to perform identity authentication on the mobile terminal when communication pairing is performed. Only a mobile terminal that obtains the identity authentication information can complete communication pairing with the digital television terminal.

The two-dimensional code encoding module 120 performs encoding according to the communication connection information to generate a two-dimensional code image.

In this embodiment of the present disclosure, the two-dimensional code encoding module 120 optionally first serializes the communication connection information acquired by the communication information acquiring module 110. Then the two-dimensional code encoding module 120 optionally encrypts the serialized communication connection information so as to ensure that information included in the two-dimensional code image is not embezzled by another terminal or program, and encodes the serialized and encrypted communication connection information, to obtain a corresponding two-dimensional code image. The two-dimensional code encoding module 120 may further include an encryption unit and an encoding unit.

The encryption unit encrypts the communication connection information acquired by the communication information acquiring module 110, for example, encrypts the communication connection information by using a preset RSA private key. A corresponding RSA public key may be pre-stored in a mobile terminal that performs communication pairing with the digital television terminal.

The encoding unit performs encoding according to the communication connection information encrypted by the encryption unit, to generate the two-dimensional code image.

The display module 130 displays the two-dimensional code image.

In this embodiment of the present disclosure, the display module 130 may display, on a screen of the digital television terminal, the two-dimensional code image obtained by the two-dimensional code encoding module 120.

The link connection module 140 establishes a link connection to a mobile terminal that acquires the two-dimensional code image by using a camera.

The communication pairing module 150 performs communication pairing with the mobile terminal by means of the established link connection. In this embodiment of the present disclosure, the communication pairing module 150 may further include a pairing request acquiring unit and an authentication unit.

The pairing request acquiring unit acquires, by means of the established link connection, a pairing authentication request sent by the mobile terminal.

In one embodiment, the authentication unit authenticates the pairing authentication request, and accepts the pairing authentication request, that is, successfully performs communication pairing with the mobile terminal, if the pairing authentication request carries the identity authentication information randomly generated by the communication information acquiring module 110.

The foregoing describes in detail a digital television terminal according to an embodiment of the present disclosure.

According to another embodiment of the present disclosure, a mobile terminal is further provided.

Figure 3:
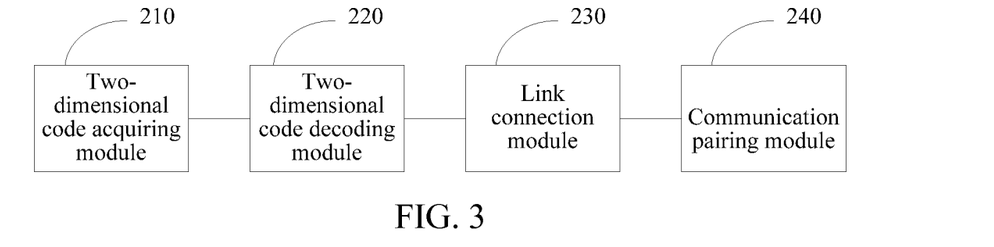
FIG. 3 is a schematic structural diagram of a mobile terminal according to an embodiment of the present disclosure.

FIG. 3 is a schematic structural diagram of a mobile terminal according to an embodiment of the present disclosure. As shown in the figure, in this embodiment of the present disclosure, the mobile terminal includes, at least, a two-dimensional code acquiring module 210, a two-dimensional code decoding module 220, a link connection module 230, and a communication pairing module 240.

The two-dimensional code acquiring module 210 acquires, by using a camera, a two-dimensional code image displayed by the digital television terminal.

The two-dimensional code decoding module 220 decodes the two-dimensional code image to obtain communication connection information of the digital television terminal. The communication connection information includes communication hardware information of the digital television terminal.

In this embodiment of the present disclosure, the communication connection information of the digital television terminal included in the two-dimensional code image includes the communication hardware information of the digital television terminal, and may further include other required information that can be used by a mobile terminal to establish a communication link connection to the digital television terminal, for example, may further include a username or password of Wi-Fi on which the digital television terminal is located. Further, in order to ensure security of the communication connection, the communication connection information may further include identity authentication information randomly generated by the digital television terminal. In addition, if the digital television terminal serializes and encrypts the communication connection information of the digital television terminal before the digital television terminal generates the two-dimensional code image, the two-dimensional code decoding module 220 further needs to perform corresponding decryption and corresponding deserialization on a decoding result of the two-dimensional code image to obtain the communication connection information of the digital television terminal. The two-dimensional code decoding module 220 may further include a decoding unit and a decryption unit.

The decoding unit decodes the two-dimensional code image.

The decryption unit decrypts a decoding result of the two-dimensional code image to obtain the communication connection information of the digital television terminal. For example, it is mentioned above that the digital television terminal encrypts the communication connection information by using a preset RSA private key. Then, the decryption unit needs to decrypt, by using a corresponding RSA public key pre-stored in the mobile terminal, the decoding result obtained by the decoding unit.

The link connection module 230 establishes a link connection to the digital television terminal according to the communication connection information of the digital television terminal.

In this embodiment of the present disclosure, the link connection module 230 may initiate establishment of the link connection to the digital television terminal according to the communication hardware information of the digital television terminal in the communication connection information of the digital television terminal. If communication with the digital television terminal further requires other information (such as a username or password of Wi-Fi), the required information, such as a username or password of Wi-Fi on which the digital television terminal is located, may also be extracted from the communication connection information obtained from the two-dimensional code image.

The communication pairing module 240 performs communication pairing with the digital television terminal by means of the established link connection.

In this embodiment of the present disclosure, after the link connection module 230 successfully establishes the link connection, the communication pairing module 240 can perform communication pairing with the digital television terminal by means of the successfully established communication link. Optionally, the communication pairing module 240 may further include: a pairing request sending unit.

The pairing request sending unit sends a pairing authentication request to the digital television terminal by means of the established link connection. The pairing authentication request carries the identity authentication information obtained by the two-dimensional code decoding module 220. The digital television terminal may determine whether the identity authentication information in the pairing authentication request is the identity authentication information randomly generated by the digital television terminal. If the identity authentication information in the pairing authentication request is the identity authentication information randomly generated by the digital television terminal, the pairing authentication request is accepted, that is, communication pairing with the mobile terminal succeeds. After pairing between the two succeeds, various remote-control signals and data transmission services can be performed by means of the communication link established by the link connection module 230.

According to an embodiment of the present disclosure, the method for communication pairing with a digital television terminal shown in FIG. 1 may be a method for communication pairing with a digital television terminal executed by the digital television terminal shown in FIG. 2 in combination with units of the mobile terminal shown in FIG. 3. For example, step S101 shown in FIG. 1 may be performed by the communication information acquiring module 110 shown in FIG. 2. Step S102 shown in FIG. 1 may be performed by the two-dimensional code encoding module 120 shown in FIG. 2. Step S103 shown in FIG. 1 may be performed by the display module 130 shown in FIG. 2. Step S104 shown in FIG. 1 may be performed by the two-dimensional code acquiring module 210 shown in FIG. 3. Step S105 shown in FIG. 1 may be performed by the two-dimensional code decoding module 220 shown in FIG. 3. Step S106 shown in FIG. 1 may be performed by the link connection module 140 shown in FIG. 2 and the link connection module 230 shown in FIG. 3. Step S107 shown in FIG. 1 may be performed by the communication pairing module 150 shown in FIG. 2 and the communication pairing module 240 shown in FIG. 3.

Figure 4:
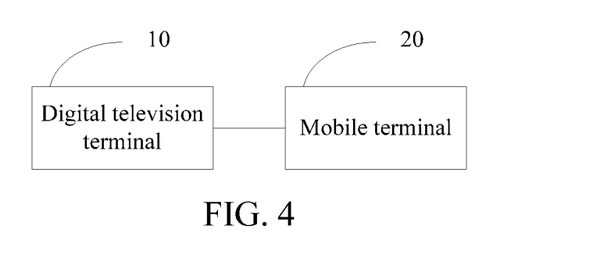
FIG. 4 is a schematic structural diagram of a system for communication pairing with a digital television terminal according to an embodiment of the present disclosure.

According to another embodiment of the present disclosure, units of the system for communication pairing with a digital television terminal shown in FIG. 4 may be separately or wholly combined into one or several other units, or one (or more) of the units herein may further be divided into multiple units of smaller functions. In this way, same operations can be implemented, and implementation of the technical effects of the embodiments of the present disclosure is not affected. The foregoing units are divided based on logical functions. In an actual application, a function of one unit may be implemented by multiple units, or functions of multiple units are implemented by one unit. In another embodiment of the present disclosure, the system for communication pairing with a digital television terminal may further include another module. However, in an actual application, these functions may also be cooperatively implemented by another unit and may be cooperatively implemented by multiple units.

According to another embodiment of the present disclosure, the system for communication pairing with a digital television terminal shown in FIG. 4 may be constructed by running a computer program (including program code) that can execute the method for communication pairing with a digital television terminal shown in FIG. 1 on a universal computing device, for example, a computer, that includes a processing element and a storage medium, so as to implement the method for communication pairing with a digital television terminal according to the embodiments of the present disclosure. The computer program may be recorded on, for example, a computer readable record medium, and may be mounted in the computing device by using the computer readable record medium and run in the computing device.

The storage medium may include, but is not limited to, a flash memory drive, a read-only memory (ROM), a random access memory (RAM), a magnetic disk, an optical disc, or the like.

The foregoing describes in detail a mobile terminal according to an embodiment of the present disclosure.

According to another embodiment of the present disclosure, a system for communication pairing with a digital television terminal is further provided.

FIG. 4 is a schematic structural diagram of a system for communication pairing with a digital television terminal according to an embodiment of the present disclosure. As shown in the figure, in this embodiment of the present disclosure, the system for communication pairing with a digital television terminal may include a digital television terminal 10 and a mobile terminal 20.

The digital television terminal 10 may be the digital television terminal described above with reference to FIG. 2. The digital television terminal can acquire communication connection information of the digital television terminal. The communication connection information includes communication hardware information of the digital television terminal, perform encoding according to the communication connection information to generate a two-dimensional code image, and display the two-dimensional code image.

The mobile terminal 20 may be the mobile terminal described above with reference to FIG. 3. The mobile terminal 20 can acquire, by using a camera, the two-dimensional code image displayed by the digital television terminal 10, decode the two-dimensional code image to obtain the communication connection information of the digital television terminal 10, establish a link connection to the digital television terminal 10 according to the communication connection information of the digital television terminal 10, and perform communication pairing with the digital television terminal 10 by means of the established link connection.

It can be known according to the foregoing technical solutions that in the embodiments of the present disclosure, communication connection information of a digital television terminal is encoded into a two-dimensional code image, and the two-dimensional code image is displayed, so that a mobile terminal can conveniently acquire the communication connection information of the digital television terminal, and further communication connection and pairing between the mobile terminal and the digital television terminal are completed simply and conveniently, which greatly simplifies the user operation process.

A person of ordinary skill in the art may understand that all or some of the processes of the methods in the foregoing embodiments may be implemented by a computer program instructing relevant hardware. The program may be stored in a computer readable storage medium. When the program is executed, processes of the foregoing method embodiments may be performed.

Disclosed above is merely preferred embodiments of the present disclosure, and certainly the protection scope of the present disclosure is not limited thereto. Therefore, equivalent changes made according to the claims of the present disclosure shall fall within the scope of the present disclosure.

What is claimed is:

1. A method for communication pairing of a digital television terminal and a mobile terminal, comprising:
   acquiring, by the digital television terminal, communication connection information of the digital television terminal, the communication connection information comprising communication hardware information of the digital television terminal;
   performing, by the digital television terminal, encoding according to the communication connection information to generate a two-dimensional code image;
   displaying, by the digital television terminal, the two-dimensional code image;
   establishing, by the digital television terminal, a link connection to the mobile terminal that acquires the two-dimensional code image by using a camera; and
   performing, by the digital television terminal, communication pairing with the mobile terminal based on the established link connection;
   wherein:
   the communication connection information further comprises identity authentication information randomly generated by the digital television terminal, and the identity authentication information is encoded in the two-dimensional code image; and
   the step of performing communication pairing with the mobile terminal based on the established link connection comprises:
   acquiring, by the digital television terminal based on the established link connection, a pairing authentication request sent by the mobile terminal; and
   accepting, by the digital television terminal, the pairing authentication request if the pairing authentication request carries the identity authentication information, wherein the communication pairing with the mobile terminal succeeds when the pairing authentication request is accepted.

2. The method for communication pairing according to claim 1, wherein the step of performing encoding according to the communication connection information to generate a two-dimensional code image comprises:
- encrypting, by the digital television terminal, the communication connection information; and
- generating, by the digital television terminal, the two-dimensional code image according to the encrypted communication connection information.

3. The method for communication pairing with a digital television terminal according to claim 2, wherein the step of encrypting the communication connection information comprises:
- encrypting the communication connection information by using a preset RSA private key.

4. The method for communication pairing according to claim 1, the step of performing encoding according to the communication connection information to generate a two-dimensional code image comprises:
- serializing and encrypting, by the digital television terminal, the communication connection information; and
- encoding, by the digital television terminal, the serialized and encrypted communication connection information to obtain the corresponding two-dimensional code image.

5. A method for communication pairing of a digital television terminal and a mobile terminal, comprising:
- acquiring, by using a camera, a two-dimensional code image displayed by the digital television terminal, wherein the digital television terminal encodes communication connection information of the digital television terminal to generate the displayed two-dimensional code image;
- decoding the two-dimensional code image to obtain the communication connection information of the digital television terminal, the communication connection information comprising communication hardware information of the digital television terminal;
- establishing a link connection to the digital television terminal according to the communication connection information of the digital television terminal; and
- performing communication pairing with the digital television terminal based on the established link connection;
- wherein: the communication connection information further comprises identity authentication information randomly generated by the digital television terminal, and the identity authentication information is encoded in the two-dimensional code image; and
- the step of performing communication pairing with the digital television terminal based on the established link connection comprises: after the link connection is successfully established between the digital television terminal and the mobile terminal, sending a pairing authentication request to the digital television terminal using the established link connection, wherein the pairing authentication request includes the identity authentication information; and when the digital television terminal authenticates and accepts the pairing authentication request, the communication pairing with the mobile terminal succeeds.

6. The method for communication pairing according to claim 5, wherein the step of decoding the two-dimensional code image to obtain communication connection information of the digital television terminal comprises:
- decoding the two-dimensional code image to obtain a decoding result; and
- decrypting the decoding result of the two-dimensional code image to obtain the communication connection information of the digital television terminal, wherein the communication connection information is encrypted by the digital television terminal for generating the two-dimensional code image.

7. The method for communication pairing according to claim 6, wherein the step of decrypting a decoding result of the two-dimensional code image to obtain the communication connection information of the digital television terminal comprises:
- decrypting the decoding result of the two-dimensional code image by using a preset RSA public key.

8. A digital television terminal, comprising: at least one processor, and a memory storing a plurality of program modules to be executed by the at least one processor, the plurality of program modules comprising: a communication information acquiring module, a two-dimensional code encoding module, a display module, a link connection module, and a communication pairing module;
wherein:
- the communication information acquiring module of the digital television terminal acquires communication connection information of the digital television terminal, the communication connection information comprising communication hardware information of the digital television terminal;
- the two-dimensional code encoding module of the digital television terminal performs encoding according to the communication connection information to generate a two-dimensional code image;
- the display module displays the two-dimensional code image;
- the link connection module establishes a link connection to a mobile terminal that acquires the two-dimensional code image by using a camera;
- the communication pairing module performs communication pairing with the mobile terminal based on the established link connection;
- the communication connection information acquired by the communication information acquiring module further comprises identity authentication information randomly generated by the digital television terminal, and the identity authentication information is encoded in the two-dimensional code image; and
- the communication pairing module of the digital television terminal comprises: a pairing request acquiring unit and an authentication unit, wherein:
  - after the link connection is successfully established between the digital television terminal and the mobile terminal, the pairing request acquiring unit acquires, based on the established link connection, a pairing authentication request sent by the mobile terminal; and
  - the authentication unit authenticates the pairing authentication request, and accepts the pairing authentication request if the pairing authentication request carries the identity authentication information.

9. The digital television terminal according to claim 8, wherein the two-dimensional code encoding module comprises: an encryption unit and an encoding unit, wherein:
- the encryption unit encrypts the communication connection information acquired by the communication information acquiring module; and
- the encoding unit performs encoding according to the communication connection information encrypted by the encryption unit, to generate the two-dimensional code image.

10. The digital television terminal according to claim 9, wherein the encryption unit encrypts the communication connection information by using a preset RSA private key.

11. A mobile terminal, comprising: at least one processor and a memory storing a plurality of program modules to be executed by the at least one processor, the plurality of program modules comprising: a two-dimensional code acquiring module, a two-dimensional code decoding module, a link connection module, and a communication pairing module;

wherein:
the two-dimensional code acquiring module acquires, by using a camera, a two-dimensional code image displayed by a digital television terminal, wherein the digital television terminal encodes communication connection information of the digital television terminal to generate the displayed two-dimensional code image;

the two-dimensional code decoding module decodes the two-dimensional code image to obtain the communication connection information of the digital television terminal, the communication connection information comprising communication hardware information of the digital television terminal;

the link connection module establishes a link connection to the digital television terminal according to the communication connection information of the digital television terminal;

the communication pairing module performs communication pairing with the digital television terminal by means of the established link connection;

the communication connection information obtained by the two-dimensional code decoding module further comprises identity authentication information randomly generated by the digital television terminal, and the identity authentication information is encoded in the two-dimensional code image; and the communication pairing module comprises: a pairing request sending unit, wherein after the link connection is successfully established between the digital television terminal and the mobile terminal, the pairing request sending unit sends a pairing authentication request to the digital television terminal based on the established link connection, wherein the pairing authentication request includes the identity authentication information.

12. The mobile terminal according to claim 11, wherein the two-dimensional code decoding module comprises: a decoding unit and a decryption unit, wherein:
the decoding unit decodes the two-dimensional code image to obtain a decoding result; and
the decryption unit decrypts the decoding result of the two-dimensional code image to obtain the communication connection information of the digital television terminal, wherein the communication connection information is encrypted by the digital television terminal for generating the two-dimensional code image.

13. The mobile terminal according to claim 12, wherein the decryption unit decrypts the decoding result of the two-dimensional code image by using a preset RSA public key.

* * * * *